(12) United States Patent
Gibson (10) Patent No.: US 7,782,780 B1
(45) Date of Patent: Aug. 24, 2010

(54) SYSTEM AND METHOD FOR ARBITRATION OF MULTICAST DATA PACKETS USING HOLDS (75) Inventor: David Gibson, Suwanee, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 861 days.

(21) Appl. No.: 11/420,837

(22) Filed: May 30, 2006

(51) Int. Cl.
*H04J 1/16* (2006.01)
*H04L 12/26* (2006.01)
(52) U.S. Cl. ..................................................... 370/235
(58) Field of Classification Search ........................ None
See application file for complete search history.

(56) References Cited

U.S. PATENT DOCUMENTS

| | | | |
|---|---|---|---|
| 5,784,003 A * | 7/1998 | Dahlgren | .................. 340/2.2 |
| 5,787,084 A | 7/1998 | Bagchi | |
| 5,862,137 A | 1/1999 | Manning | |
| 5,956,342 A | 9/1999 | Manning | |
| 6,208,644 B1 | 3/2001 | Pannell et al. | |
| 6,629,176 B1 | 9/2003 | Rhee | |
| 6,722,256 B2 | 8/2004 | Regev | |
| 6,963,576 B1 | 11/2005 | Lee | |
| 5,301,055 A1 | 5/2006 | Hoang | |
| 7,391,787 B1 * | 6/2008 | McCrosky | .................. 370/413 |
| 7,519,065 B2 | 4/2009 | Angle et al. | |
| 2004/0081108 A1 | 4/2004 | Kloth et al. | |
| 2005/0278510 A1 * | 12/2005 | Jacobs et al. | ................. 712/218 |

* cited by examiner

*Primary Examiner*—Raj Jain
(74) *Attorney, Agent, or Firm*—Stanley J. Pawlik; Kenneth Glass & Associates (57) ABSTRACT

An arbiter generates an availability signal indicating whether pseudo-ports are available for receiving data. Each pseudo-port identifies one or more output ports of a packet switch. The availability signal also indicates whether each pseudo-port has a hold. A hold on a pseudo-port indicates that the pseudo-port is being held for an input port of the packet switch. Although the packet switch may complete routing of a data packet in progress to an output port of the pseudo-port that has the hold, the packet switch will not initiate routing of a data packet to an output port of the pseudo-port until each output port of the pseudo-port is available. When all the output ports of the pseudo-port are available, the packet switch can route data of a data packet from the input port for which the pseudo-port is being held to each output port of the pseudo-port.

12 Claims, 4 Drawing Sheets

SYSTEM AND METHOD FOR ARBITRATION OF MULTICAST DATA PACKETS USING HOLDS

CROSS-REFERENCE TO RELATED APPLICATION

The present application is related to co-pending U.S. patent application Ser. No. 11/419,572, filed May 22, 2006, entitled "System and Method for Arbitration Using Availability Signals," which is incorporated herein by reference in its entirety.

BACKGROUND

1. Field of the Invention

The present invention generally relates to packet switches, and more particularly to performing arbitration for multicast data packets in a packet switch.

2. Description of Related Art

Modern telecommunication networks include packet switching networks for transmitting data from a source device to a destination device. The packet switching network routes data packets through a network of interconnected packet switches based on destination addresses in the data packets. An individual packet switch in the packet switching network routes data packets from input ports to output ports of the packet switch.

Because the packet switch may receive multiple data packets at the input ports that are destined for the same output port, the packet switch often includes an arbiter that determines an order for routing data packets through the packet switch. The input ports of the packet switch issue grant requests to the arbiter for routing data contained in data packets to the output ports. The arbiter then determines whether the output port identified by each grant request is available to receive data. If an output port identified by a grant request is available to receive data, the arbiter selects a grant request that identifies the output port and issues a grant to the input port that issued the selected grant request. The packet switch then routes data contained in a data packet of each input port that received a grant to the output port identified by the selected grant request issued by the input port.

The arbiter may receive a grant request from an input port for routing a multicast data packet from the input port to multiple output ports. The grant request typically includes a destination address that identifies a multicast group containing the multiple output ports. The arbiter determines whether each output port of the multicast group is available to receive data of the multicast data packet. If each output port of the multicast group is available, the arbiter can select the grant request and issue a grant to the input port that issued the selected grant request. The packet switch then routes the data of the multicast data packet to each output port of the multicast group. Determining whether each output port of the multicast group is available to receive data of a data packet is a time consuming process, which may affect the performance of the packet switch. Moreover, selection of the grant request for the multicast data packet may be delayed indefinitely until each output port of the multicast group is available to receive data of the multicast data packet.

In light of the above, a need exists for reducing the time required for selecting a multicast data packet for routing through a packet switch. A further need exists for reducing the time required for routing a multicast data packet through a packet switch.

SUMMARY

In various embodiments, a packet switch includes an arbiter that generates an availability signal indicating whether one or more pseudo-ports are available for receiving data. Each pseudo-port identifies one or more output ports of the packet switch. A pseudo-port is available if each output port identified by the pseudo-port is available to receive data. An input port of the packet switch receives a data packet, generates a grant request identifying a pseudo-port, and issues the grant request to a grant request filter. The grant request filter determines based on the availability signal whether the grant request is serviceable by the packet switch. The grant request is serviceable by the packet switch if the pseudo-port identified by the grant request is available. If the grant request is a serviceable grant request, the grant request filter issues the grant request to the arbiter. The arbiter can then select the serviceable grant request. Because the availability signal indicates whether each pseudo-port is available, the arbiter can quickly determine whether a grant request is serviceable. Moreover, the arbiter can generate the availability signal and the input port can generate the grant request substantially in parallel with each other.

If a grant request for a multicast data packet is not serviceable by the packet switch, a grant request filter can issue a hold request to the arbiter. In response to the hold request, the arbiter can issue a hold grant to the grant request filter indicating that the pseudo-port is being held for the input port that issued the grant request. In addition to issuing the hold grant, the arbiter updates the availability signal to indicate the pseudo-port has a hold. Although the packet switch may complete routing of a data packet in progress from another input port to an output port of the pseudo-port that has the hold, another grant request filter will not issue a serviceable grant request identifying the pseudo-port that has the hold to the arbiter. The arbiter may also update the availability signal to indicate that other pseudo-ports are no longer available because the pseudo-port has a hold. After the pseudo-port that has the hold becomes available, the grant request filter that received the hold grant issues a serviceable grant request identifying the pseudo-port to the arbiter. The arbiter selects the serviceable grant request and issues a grant to the input port that issued the grant request for the multicast data packet. The packet switch then routes data of the multicast data packet from the input port to the output ports of the pseudo-port. Further, the arbiter updates the availability signal to indicate that the pseudo-port no longer has a hold.

A method for arbitration in a packet switch, in accordance with one embodiment, includes generating in a first clock cycle an availability signal indicating whether each pseudo-port of a plurality of pseudo-ports is available in a second clock cycle following the first clock cycle. Each pseudo-port of the plurality of pseudo-ports identifies a second plurality of output ports in a first plurality of output ports of the packet switch. Further, each pseudo-port of the plurality of pseudo-ports is available if each output port of the second plurality of output ports is available to receive data in the second clock cycle. The method also includes receiving a first grant request identifying a first input port of a first plurality of input ports of the packet switch and a first pseudo-port of the plurality of pseudo-ports. The method further includes determining the first grant request is not serviceable in the second clock cycle based on the availability signal, issuing a hold request, and issuing a hold grant in response to the hold request. The hold grant indicates the first pseudo-port is being held for the first input port. Additionally, the method includes receiving a second grant request identifying the first input port and the first pseudo-port, determining the second grant request is serviceable in the second clock cycle based on the availability signal and the hold grant, issuing the second grant request as a serviceable grant request, and issuing a grant in response to the serviceable grant request.

A system for arbitration in a packet switch, in accordance with one embodiment, includes an arbiter and a first grant request filter coupled to the arbiter. In a first clock cycle, the arbiter generates an availability signal indicating whether each pseudo-port of a plurality of pseudo-ports is available in a second clock cycle following the first clock cycle. Each pseudo-port identifies a second plurality of output ports in a first plurality of output ports of the packet switch. Moreover, each pseudo-port is available if each output port of the second plurality of output ports is available to receive data in the second clock cycle. The first grant request filter receives a first grant request identifying a first input port of the first plurality of input ports and a first pseudo-port of the plurality of pseudo-ports, determines the first grant request is not serviceable in the second clock cycle based on the availability signal, and issues a hold request. The arbiter further issues a hold grant in response to the hold request. The hold grant indicates that the first pseudo-port is being held for the first input port. The first grant request filter receives a second grant request identifying the first input port and the first pseudo-port, determines the second grant request is serviceable in the second clock cycle based on the availability signal and the hold grant, and issues the second grant request to the arbiter as a serviceable grant request. The arbiter issues a grant in response to the serviceable grant request.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, an arbitration system for a packet switch includes an arbiter and grant request filters. The grant request filters receive grant requests from input ports of the packet switch for routing data packets through the packet switch. Each grant request identifies a pseudo-port. In a current clock cycle, the arbiter generates an availability signal identifying any pseudo-ports available in a subsequent clock cycle. Each pseudo-port identifies one or more output ports that are available to receive data in the subsequent clock cycle. The grant request filters determine whether grant requests received from the input ports are serviceable by the packet switch in the subsequent cycle based on the availability signal. If a grant request is serviceable, a grant request filter issues the grant request to the arbiter as a serviceable grant request. In response to the serviceable grant request, the arbiter can select the serviceable grant request and issue a grant in response to the serviceable grant request. The packet switch can then route data of a data packet from each input port that generated a selected grant request to each output port of the pseudo-port identified by the selected grant request.

If the grant request is not serviceable, the grant request filter issues a hold request identifying the pseudo-port to the arbiter. The arbiter can select the hold request and issue a hold grant to the grant request filter in response to the hold request. The hold grant indicates the pseudo-port is being held for the input port. In addition to issuing the hold grant, the arbiter updates the availability signal to indicate the pseudo-port has a hold. As a result, another grant request filter will not issue a serviceable grant request identifying the pseudo-port that has the hold to the arbiter. The grant request filter that issued the hold request can receive a subsequent grant request identifying the pseudo-port, determine that the subsequent grant request is serviceable based on the availability signal and the hold grant, and issue the grant request to the arbiter as a serviceable grant request. The arbiter can issue a grant in response to the serviceable grant request, and the packet switch can then route data of a data packet from the input port that generated the selected grant request to each output port of the pseudo-port identified by the selected grant request.

Figure 1:
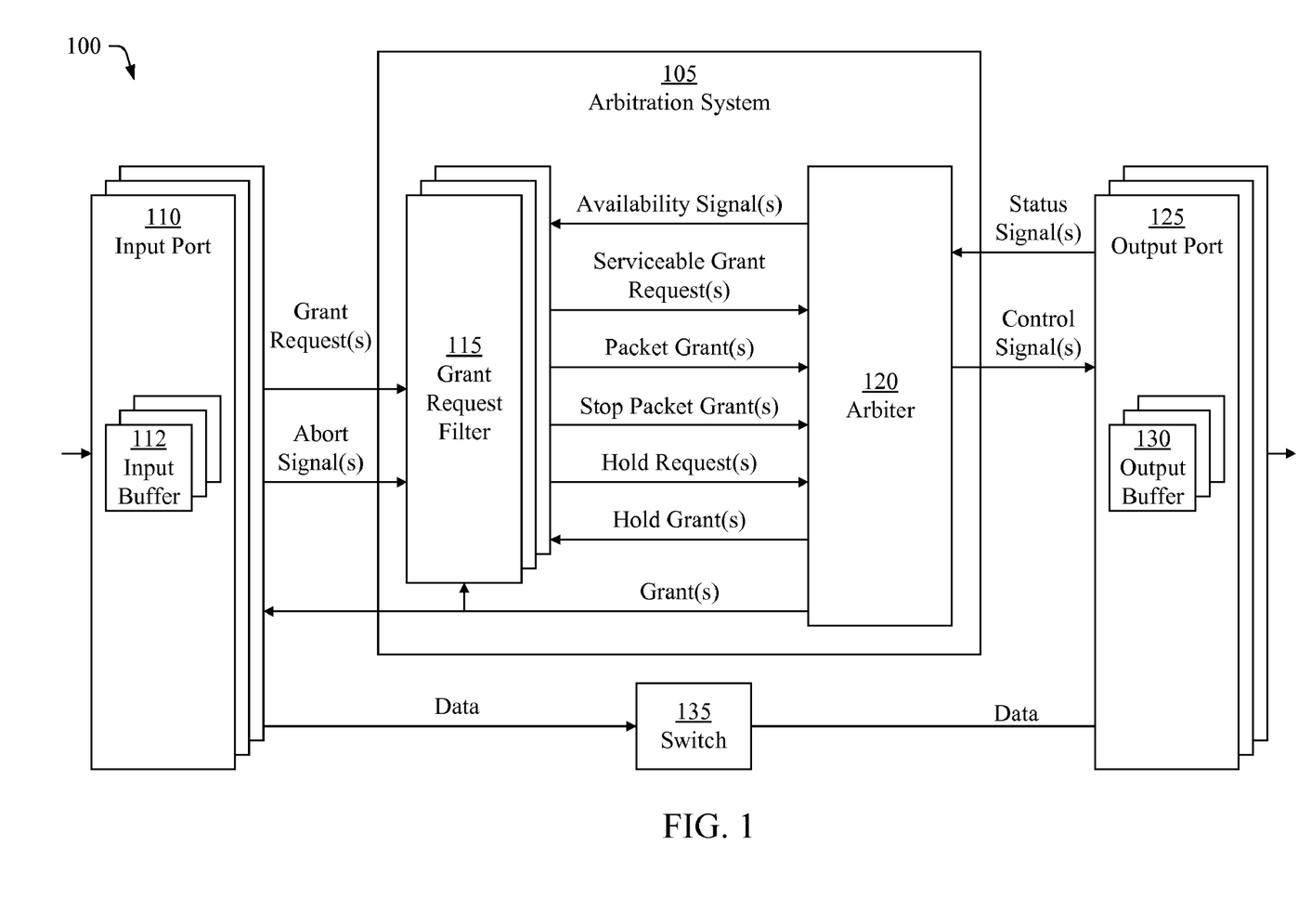
FIG. 1 is a block diagram of a packet switch including an arbitration system, in accordance with an embodiment of the present invention.

FIG. 1 illustrates a packet switch 100, in accordance with an embodiment of the present invention. The packet switch 100 includes input ports 110, an arbitration system 105, output ports 125, and a switch 135. The arbitration system 105 includes grant request filters 115 and an arbiter 120. Each grant request filter 115 is coupled to a corresponding input port 110 and to the arbiter 120. Additionally, the arbiter 120 and the switch 135 are each coupled to each input port 110 and to each output port 125.

Each input port 110 includes one or more input buffers 112 for storing data. In some embodiments, each input buffer 112 has a priority and stores data packets having the priority of the input buffer 112. In other embodiments, the input port 110 stores data packets having different priorities into the same input buffer 112. Each output port 125 includes one or more output buffers 130 for storing data. In some embodiments, each output buffer 130 has a priority and stores data packets having the priority of the output buffer 130. In other embodiments, the output port 125 stores data packets having different priorities into the same output buffer 130.

In one embodiment, each input port 110 can receive data of a data packet and can issue a grant request to the grant request filter 115 that corresponds to the input port 110. The grant request includes a pseudo-port identifier, which identifies a pseudo-port. A pseudo-port identifies one or more output ports 125 of the packet switch 100. In addition to the grant request received from the input port 110, the grant request filter 115 receives an availability signal from the arbiter 120. The arbiter 120 generates the availability signal in a current clock cycle based on a status signal received from the output ports 125. The status signal indicates the amount of data stored in each of the output ports 125. The availability signal indicates whether each pseudo-port is available in a subsequent clock cycle. A pseudo-port is available in the subsequent clock cycle if each output port 125 of the pseudo-port (e.g., each output port 125 identified by the pseudo-port) is available to receive data in the subsequent clock cycle.

In some embodiments, a pseudo-port may also identify one or more characteristics that determine whether each output port 125 of the pseudo-port is available. In one embodiment, a characteristic of a pseudo-port is a priority. In this embodiment, an output port 125 of the pseudo-port is available if the output port 125 is available to receive, in the subsequent clock cycle, data having the priority of the pseudo-port (e.g., the priority identified by the pseudo-port).

In a further embodiment, each output port 125 includes a plurality of output buffers 130, each of which has a priority. Each of the output buffers 130 can store data having a priority that is the same as the priority of the output buffer 130. Moreover, a pseudo-port can identify one or more output ports 125 as well as a priority. In this embodiment, each output port 125 of the pseudo-port is available if the output buffer 130 having the priority in the output port 125 is available to receive data in the subsequent clock cycle.

In embodiments in which a pseudo-port identifies a characteristic, multiple pseudo-ports can identify the same output ports 125 if each of the multiple pseudo-ports identifies a different characteristic of the output ports 125. For example, multiple pseudo-ports that identify the same output ports 125 can each identify a different priority. In this way, each of the multiple pseudo-ports can identify different output buffers 130 in the output ports 125 of the pseudo-port based on the priority of the pseudo-port.

In one embodiment, the status signal indicates the amount of data stored in each of the output buffers 130. For example, the status signal may indicate whether each output buffer 130 of each output port 125 has the capacity to store data in a subsequent clock signal. In one embodiment, the status signal indicates whether each of the output buffers 130 has the capacity to store, in the subsequent clock cycle, a maximum-sized data packet having the priority of the output buffer 130.

In various embodiments, the status signal may indicate if each output buffer 130 is full, almost full, or both. In some embodiments, an output buffer 130 is deemed full if the output buffer 130 does not have the capacity to store a maximum-sized data packet in a subsequent clock cycle following the current clock cycle. In addition, the output buffer 130 is deemed almost full if the output buffer 130 has the capacity to store a maximum-sized data packet in the subsequent clock cycle, but does not have the capacity to store the maximum-sized data packet and one or more additional data words in the subsequent clock cycle.

The grant request filter 115 determines whether a grant request is serviceable by the switch 135 in the subsequent clock cycle based on the availability signal received from the arbiter 120. The grant request can be serviced in the subsequent clock cycle if the switch 135 can route data from an input port 110 identified by the grant request to each output buffer 130 of a pseudo-port identified by the grant request. If the grant request is a serviceable, the grant request filter 115 issues the grant request to the arbiter 120 as a serviceable grant request. In this way, the grant request filter 115 filters grant requests received from the input port 110 such that the arbiter 120 receives those grant requests that are serviceable grant requests.

In the subsequent clock cycle, the arbiter 120 selects one or more of the serviceable grant requests received from the grant request filters 115 and issues a grant to each input port 110 that issued a selected grant request. Additionally, the arbiter 120 issues a grant to the grant request filter 115 corresponding to the input port 110 that issued the selected grant request. In response to the grant, the input port 110 sends data of a data packet to the switch 135, and the switch 135 routes the data to each output port 125 of the pseudo-port identified by the selected grant request. In turn, each output port 125 of the pseudo-port stores the data.

In one embodiment, the switch 135 routes the data to each output buffer 130 of each output port 125, and the arbiter 120 provides a control signal to each output port 125 of the pseudo-port. In turn, each output port 125 of the pseudo-port stores the data in an output buffer 130 of the output port 125 based on the control signal. In various embodiments, the data is a data word of a data packet contained in an input buffer 112 of the input port 110. The data word can contain any number of data bits such as, for example, thirty-two data bits.

In a further embodiment, a grant request filter 115 that received a grant from the arbiter 120 can issue a packet grant for the input port 110 to the arbiter 120 for routing a data packet. The packet grant identifies the input port 110 corresponding to the grant request filter 115 and the pseudo-port identified by the grant request issued by the input port 110. In response to the packet grant, the arbiter 120 updates the availability signal to indicate that the pseudo-port identified by the packet grant is not available. In this way, the pseudo-port identified by the packet grant is reserved for the input port 110 identified by the packet grant. If an input port 110 has an outstanding packet grant identifying the pseudo-port (e.g., the packet grant has not been relinquished), the grant request filter 115 corresponding to the input port 110 can issue a subsequent grant request identifying the pseudo-port to the arbiter 120 as a serviceable grant request without first determining whether the grant request is serviceable.

After the switch 135 routes the last data word of the data packet to each output port 125 of the pseudo-port identified by the selected grant request, the grant request filter 115 issues a stop packet grant to the arbiter 120 indicating the packet grant is relinquished. In turn, the arbiter 120 updates the availability signal to indicate the pseudo-port identified by the packet grant is available. In this way, the packet grant reserves the pseudo-port identified by the packet grant for the input port 110 identified by the packet grant until the arbiter 120 receives the stop packet grant from the grant request filter 115. In one embodiment, the grant request filter 115 issues a packet grant to the arbiter 120 by asserting a packet grant signal. Further, the grant request filter 115 issues a stop packet grant to the arbiter 120 by deasserting the packet grant signal. Thus, the packet grant signal is used to both issue the packet grant and to issue the stop packet grant.

In one embodiment, the input port 110 can provide an abort signal to the grant request filter 115 to abort routing of a data packet. In response to the abort signal, the grant request filter 115 issues a stop packet grant to the arbiter 120 to relinquish the packet grant. In turn, the arbiter 120 updates the availability signal to indicate that the pseudo-port identified by the packet grant is available. In this process, the arbiter 120 may also update the availability signal to indicate that other pseudo-ports have become available because the pseudo-port identified by the packet grant is available. In addition to providing the abort signal to the grant request filter 115, the input port 110 appends control information to data of the data packet indicating that any data of the data packet is to be discarded. The switch 135 routes the data containing the control information to each output port 125 of the pseudo-port identified by the packet grant. In turn, each output port 125 of the pseudo-port discards the data along with any other data of the data packet stored in the output port 125.

Although three input ports 110 and three input buffers 112 are illustrated in FIG. 1, the packet switch 100 can have more or fewer input ports 110, and each input port 110 can have more or fewer input buffers 112 in other embodiments. Although three output ports 125 and three output buffers 130 are shown in FIG. 1, the packet switch 100 can have more or fewer output ports 125 and each output port 125 can have more or fewer output buffers 130 in other embodiments.

Figure 2:
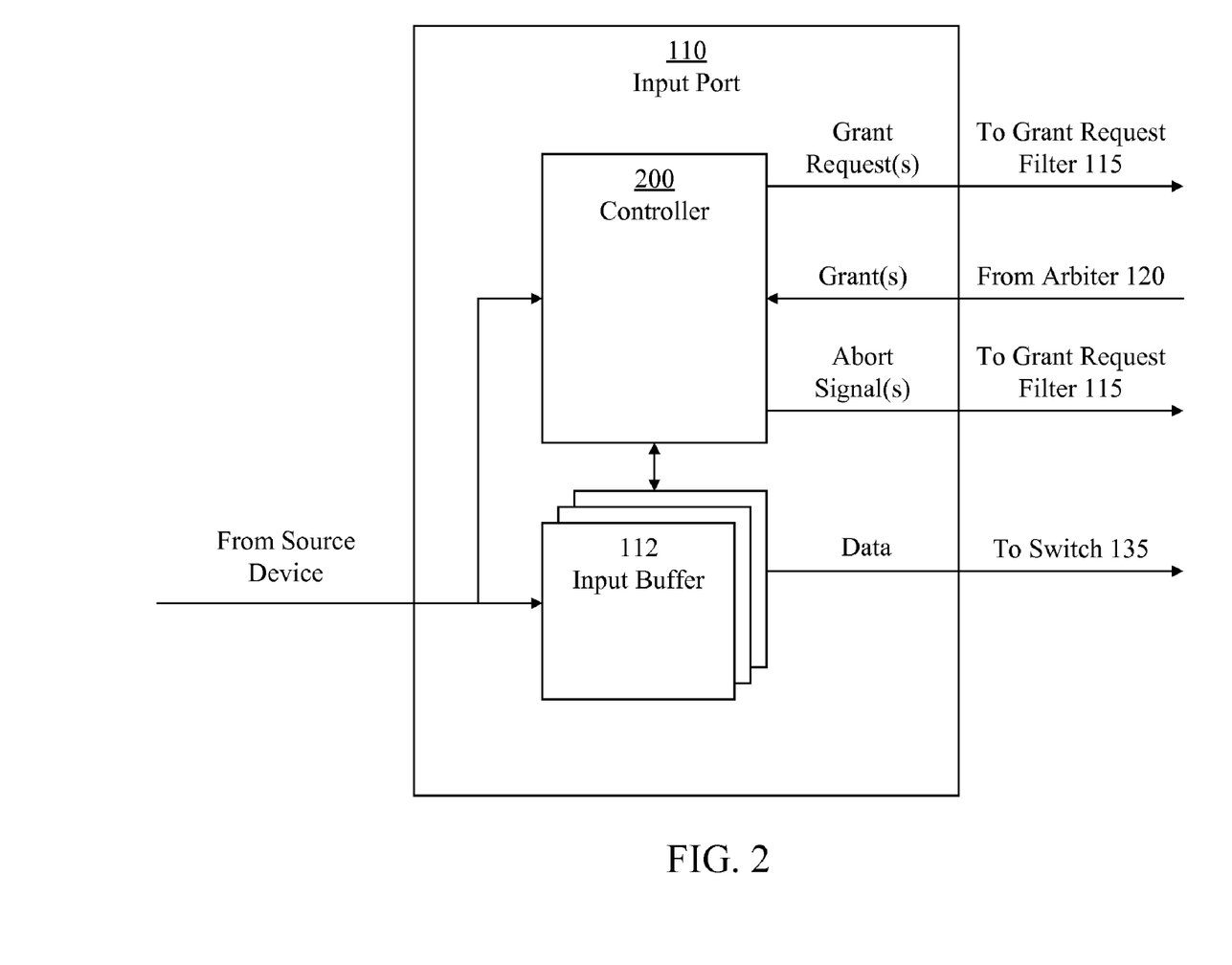
FIG. 2 is a block diagram of an input port, in accordance with an embodiment of the present invention.

FIG. 2 illustrates an input port 110, in accordance with an embodiment of the present invention. The input port 110 includes a controller 200 coupled to each input buffer 112. In operation, the input port 110 receives a data word of a data packet having a priority. The controller 200 identifies the priority of the data packet and provides a signal to the input buffer 112 having the priority of the data packet to write the data word of the data packet into the input buffer 112. In this way, data words having a given priority are stored in the input buffer 112 having that priority. Similarly, the controller 200 can write subsequent data words of the data packet into the input buffer 112 having the priority of the data packet. In this way, the controller 200 accumulates the data words of the data packet in the input buffer 112.

The controller 200 identifies the input buffer 112 having the highest priority that contains a data word of a data packet and issues a grant request to the grant request filter 115 (FIG. 1) corresponding to the input port 110 containing the data word. If the controller 200 receives a grant from the arbiter 120 (FIG. 1) in response to the grant request, the controller 200 provides a signal to the input buffer 112 having the highest priority. In turn, the input buffer 112 provides the data word to the switch 135 (FIG. 1) for routing the data word to each output port 125 (FIG. 1) of a pseudo-port identified by the grant request. In one embodiment, the input buffer 112 appends one or more data bits to the data word indicating control information for the data word. Each output port 125 of the pseudo-port can then process the data word based on the control bits. For example, the output port 125 can determine, based on the control bits, whether to store the data word, to ignore the data word, or to discard the data word along with any other data word associated with the data packet.

Figure 3:
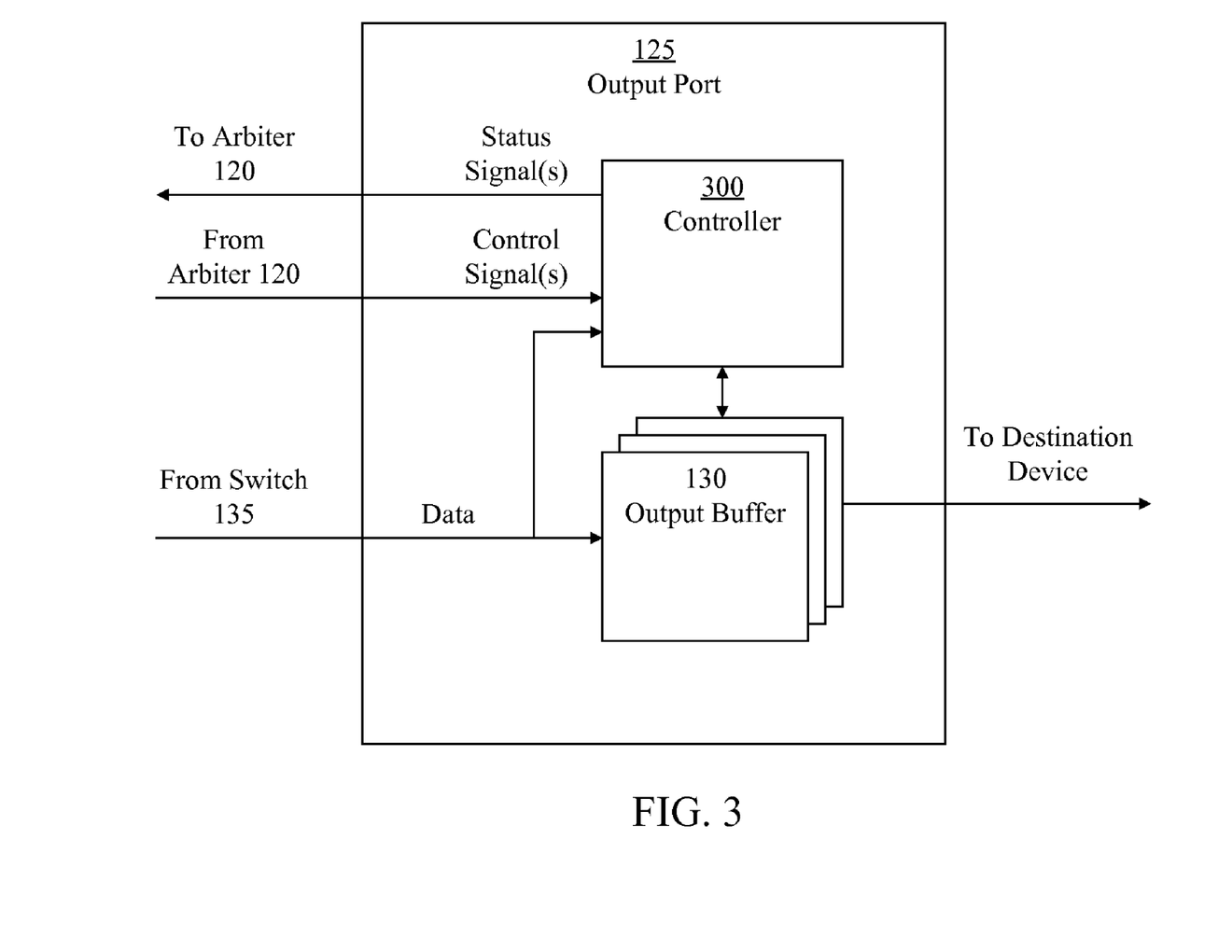
FIG. 3 is a block diagram of an output port, in accordance with an embodiment of the present invention.

FIG. 3 illustrates an output port 125, in accordance with an embodiment of the present invention. The output port 125 includes a controller 300 coupled to the arbiter 120 (FIG. 1) and to each output buffer 130. Further, each output port 125 is coupled to the switch 135 (FIG. 1) and may be coupled to a destination device (not shown). The controller 300 monitors each of the output buffers 130, generates a status signal in a current clock cycle, and provides the status signal to the arbiter 120. Additionally, the controller 300 can select one of the output buffers 130 containing a data word of a data packet and can provide a signal to the selected output buffer 130 to transmit the data word to the destination device (not shown) in the current clock cycle. For example, the output buffer 130 can be a first-in-first-out (FIFO) queue.

In one embodiment, the switch 135 (FIG. 1) provides a data word to each output buffer 130 in the output port 125 and the arbiter 120 (FIG. 1) provides a control signal to the controller 300 indicating which output buffer 130 is to store the data word. In response to the control signal, the controller 300 provides a signal to the output buffer 130 identified by the control signal to write the data word into the output buffer 130.

Referring again to FIG. 1, in various embodiments, an input port 110 can issue a grant request for a multicast data packet to the grant request filter 115 corresponding to the input port 110. If at least one output port 125 of the pseudo-port identified by the grant request is not available, the grant request filter 115 can issue a hold request identifying the pseudo-port to the arbiter 120. The arbiter 120 can then select the hold request and issue a hold grant to the grant request filter 115 that issued the selected hold request. The hold grant indicates that the arbiter 120 is holding the pseudo-port identified by the selected hold request for the input port 110 corresponding to the grant request filter 115 that issued the selected hold request.

In addition to issuing the hold grant, the arbiter 120 updates the availability signal to indicate that the pseudo-port identified by the selected hold request has a hold. In one embodiment, the availability signal has a hold indicator corresponding to each pseudo-port indicating whether the pseudo-port has a hold. The arbiter 120 updates the hold indicator corresponding to the pseudo-port identified by the selected hold request to indicate that the pseudo-port has a hold. Additionally, the arbiter 120 updates the availability signal to indicate that the pseudo-port identified by the selected hold request is not available. Moreover, a grant request filter 115 corresponding to an input port 110 that does not have an outstanding packet grant or hold grant identifying the pseudo-port that has the hold will not issue a serviceable grant request identifying the pseudo-port to the arbiter 120. Thus, an input port 110 that does not have an outstanding packet grant or hold grant identifying the pseudo-port that has the hold will not receive a grant in response to a grant request identifying the pseudo-port.

In addition to updating the availability signal to indicate that the pseudo-port has a hold, the arbiter 120 updates any other pseudo-port that is not available because the pseudo-port has a hold. In one embodiment, a pseudo-port is not available if that pseudo-port identifies one or more output ports 125 also identified by a pseudo-port that has a hold. In another embodiment, a pseudo-port is not available if the pseudo-port identifies a priority that is also identified by a pseudo-port that has a hold.

After the arbiter 120 issues the hold grant to the grant request filter 115 for the input port 110 corresponding to the grant request filter 115, the input port 110 can issue another grant request identifying the pseudo-port of the hold request to the grant request filter 115. In turn, the grant request filter 115 determines whether the pseudo-port identified by the grant request is available. If the pseudo-port identified by the grant request is available, the grant request filter 115 issues the grant request to the arbiter 120 as a serviceable grant request. The arbiter 120 can select the serviceable grant request and issue a grant to both the grant request filter 115 that issued the selected grant request and to the input port 110 corresponding to the grant request filter 115.

In addition to issuing the grant, the arbiter 120 updates the availability signal to indicate that the pseudo-port no longer has a hold. In this way, the arbiter 120 relinquishes the hold grant. As described more fully herein, the grant request filter 115 can also issue a packet grant request to the arbiter 120 to reserve the pseudo-port identified by the grant request until the grant request filter 115 issues a stop packet grant to the arbiter 120. If the grant request filter 115 does not issue a packet grant to the arbiter 120 in response to the grant received from the arbiter 120, the arbiter 120 updates the availability signal to indicate that the pseudo-port identified by the hold request is available. Additionally, the arbiter 120 can update the availability signal to indicate that another pseudo-port is available because the pseudo-port no longer has a hold.

If multiple grant request filters 115 each issue a hold request to the arbiter 120, the arbiter 120 may select one or more of the hold requests if each output port 125 of the pseudo-port identified by the hold request is not identified by another pseudo-port that has a hold. The arbiter 120 may select multiple hold requests if the pseudo-ports identified by the hold requests do not each identify a same output port 125. In one embodiment, the arbiter 120 may select multiple hold requests if the pseudo-ports identified by the hold requests each identify a different priority. The arbiter 120 can select a hold request, for example, based on a round robin algorithm. The arbiter 120 then issues a hold grant to the grant request filter 115 that issued the selected hold request.

In one embodiment, the availability signal includes an availability indicator and a hold indicator for each pseudo-port in the packet switch 100. The availability indicator indicates whether the pseudo-port associated with the availability indicator is available in a subsequent clock cycle following a current clock cycle. The hold indicator indicates whether the pseudo-port associated with the hold indicator has a hold in the subsequent clock cycle following the current clock cycle. In this embodiment, a grant request filter 115 that receives a grant request can identify both an availability indicator and a hold indicator associated with a pseudo-port based on a pseudo-port identifier in the grant request. The grant request filter 115 determines whether the grant request is a serviceable grant request by determining whether the availability indicator identified by the pseudo-port identifier indicates the pseudo-port is available and whether the hold indicator identified by the pseudo-port identifier indicates the pseudo-port has a hold, as is described more fully herein.

In one embodiment, the arbiter 120 generates an availability vector that includes an availability bit and a hold bit associated with each pseudo-port. Each availability bit indicates whether the pseudo-port associated with the availability bit is available in a subsequent clock cycle following a current clock cycle. Each hold bit indicates whether the pseudo-port has a hold in the subsequent clock cycle. For example, an availability bit may have a value of one to indicate the pseudo-port associated with the availability bit is available or a value of zero to indicate that the pseudo-port is not available. Further, a hold bit may have a value of one to indicate the pseudo-port associated with the hold bit has a hold or a value of zero to indicate that the pseudo-port does not have a hold.

The arbiter 120 may store the availability vector in a register or memory (not shown) of the arbitration system 105. In one embodiment, the availability signal represents the availability vector. For example, the availability signal may be a data bus including a data signal corresponding to each availability bit that indicates the value of the availability bit and a data signal corresponding to each hold bit that indicates the value of the hold bit. In this way, the availability signal includes an availability indictor (e.g., a data signal) indicating whether each pseudo-port is available and a hold indicator (e.g., a data signal) indicating whether each pseudo-port has a hold.

In a further embodiment, a pseudo-port is user-programmable. In this embodiment, a user can select one or more output ports 125 and program a pseudo-port to identify each of the selected output ports 125 as well as one or more characteristics. A user can program a pseudo-port, for example, by storing data in a register or memory of the arbiter 120. In various embodiments, pseudo-ports may identify fixed output ports 125 or pseudo-ports may be programmable, or some combination thereof. In one embodiment, the arbitration system 105 includes unicast pseudo-ports and multicast pseudo-ports. In this embodiment, each of the unicast pseudo-ports identifies a fixed output port 125, and each of the multicast pseudo-ports is programmable to identify one or more output ports 125. In other embodiments, some or all of the unicast pseudo-ports may be programmable and some or all of the multicast pseudo-ports may be fixed.

Although the subsequent clock cycle referred to herein may be a clock cycle immediately following a current clock cycle, the subsequent clock cycle may be a clock cycle that follows the current clock cycle after a predetermined number of intermediate clock cycles. Moreover, the availability signal may indicate which pseudo-ports are available in the subsequent clock cycle that follows the predetermined number of intermediate clock cycles following the current clock cycle. In this way, the arbiter 120 may have a pipelined architecture, as would be appreciated by those skilled in the art.

In various embodiments, the grant request filter 115 may include logic circuits, storage devices, controllers, processors, software, firmware, or the like. For example, the grant request filter 115 may include a state machine, a register, a memory device, a microprocessor, a microcontroller, an embedded processor, computing instructions, or any combination thereof. Similarly, the arbiter 120 may include logic circuits, storage devices, processors, software, firmware, or the like. For example, the arbiter 120 may include a state machine, a register, a memory device, a microprocessor, a microcontroller, an embedded processor, computing instructions, or any combination thereof. The switch 135 may include any switch, switch interconnect, switching network, software, device, or any hardware or software technology for routing data or data packets. For example, the switch 135 may include one or more logic circuits interconnected in a switching network.

In various embodiments, pseudo-ports may identify characteristics of a data packet. For example, a characteristic of a pseudo-port may be a type, length, or protocol of a data packet, or other information contained in a data packet. In some embodiments, pseudo-ports may identify characteristics of a source device or a destination device of the packet switch 100. For example, the destination device may include a digital signal processor (DSP), and a characteristic of the pseudo-port may be a characteristic of a memory structure in the digital signal processor. In this way, the packet switch 100 can be tailored for the memory structure of the digital signal processor. Other examples of source and destination devices are found in U.S. patent application Ser. No. 11/383,165, filed May 12, 2006, entitled "Packet Processing in a Packet Switch with Improved Output Data Distribution," which is incorporated herein by reference in its entirety. Further, the output ports 125 may have the same characteristics of the pseudo-ports for storing data. In some embodiments, the packet switch 100 may be a data switch that routes data not contained in data packets. For example, the packet switch 100 may be a node of an interconnect network.

Figure 4:
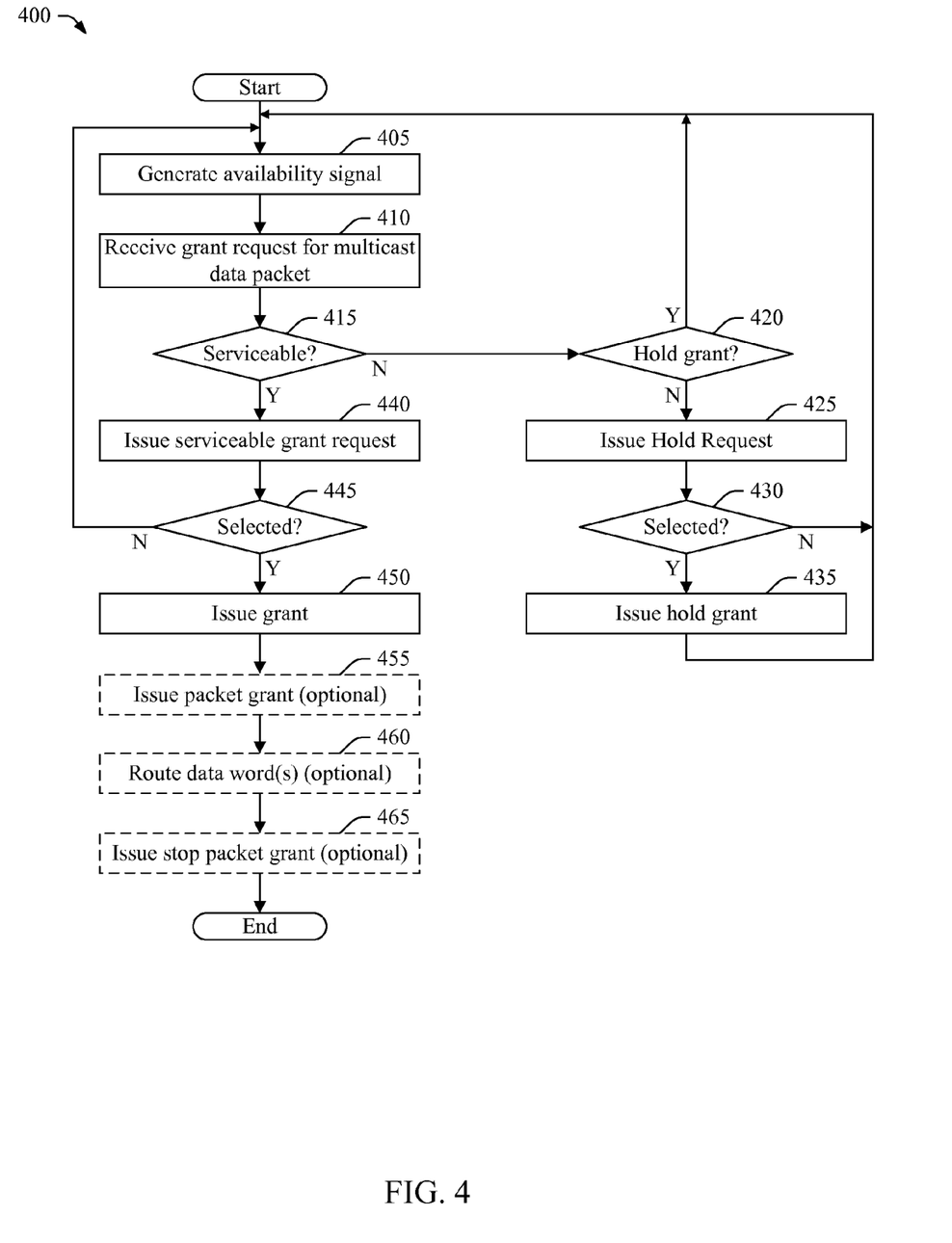
FIG. 4 is a flow chart of a method for arbitration in a packet switch, in accordance with an embodiment of the present invention.

FIG. 4 illustrates a method 400 for arbitration in the packet switch 100, in accordance with an embodiment of the present invention. In step 405, the arbiter 120 generates, in a current clock cycle, an availability signal identifying which pseudo-ports are available in a subsequent clock cycle. The method 400 then proceeds to step 410.

In step 410, a grant request filter 115 receives a grant request for a multicast data packet from the input port 110 corresponding to the grant request filter 115. The grant request identifies the input port 110 and a pseudo-port. The method 400 then proceeds to step 415.

In step 415, the grant request filter 115 determines whether the grant request is serviceable based on the availability signal. In one embodiment, the grant request filter 115 determines whether the grant request is serviceable by identifying a pseudo-port identifier in the grant request and identifying an availability indicator and a hold indicator in the availability signal based on the pseudo-port identifier. The grant request filter 115 then determines whether the grant request is serviceable based on the availability indicator and the hold indicator. If the availability indictor indicates the pseudo-port is available and the hold indicator indicates that the pseudo-port does not have a hold, the grant request is serviceable. Additionally, if the input port 110 corresponding to the grant request filter 115 has an outstanding hold grant identifying the pseudo-port and the availability indicator indicates the port is available, the grant request is serviceable. If the grant request is serviceable, the method 400 proceeds to step 440, otherwise the method 400 proceeds to step 420.

In step 420, arrived at from the determination in step 415 that the grant request is not serviceable, the grant request filter 115 determines whether the input port 110 corresponding to the grant request filter 115 has an outstanding hold grant identifying the pseudo-port. If the input port 110 corresponding to the grant request filter 115 has an outstanding hold grant identifying the pseudo-port, the method returns to step 405, otherwise the method proceeds to step 425.

In step 425, the grant request filter 115 issues a hold request identifying the input port 110 and the pseudo-port to the arbiter 120. The method 400 then proceeds to step 430.

In step 430, the arbiter 120 determines whether to select the hold request. The arbiter 120 can determine whether to select the hold request based on a selection algorithm. For example, the arbiter 120 can select the hold request based on a round robin algorithm. If the arbiter 120 selects the hold request, the method 400 proceeds to step 435, otherwise the method 400 returns to step 405.

In step 435, arrived at from the determination in step 430 that the arbiter 120 selected the hold request, the arbiter 120 issues a hold grant to the grant request filter 115 that issued the hold request. The hold grant indicates that the pseudo-port identified by the hold request is being held for the input port 110 corresponding to the grant request filter 115. Additionally, the arbiter 120 updates the availability signal to indicate the pseudo-port identified by the hold request has a hold. In one embodiment, the arbiter 120 updates the availability signal by updating a hold indicator corresponding to the pseudo-port in the availability signal to indicate that the pseudo-port has a hold. The method 400 then returns to step 405.

In step 440, arrived at from the determination in step 415 that the grant request is serviceable, the grant request filter 115 issues the grant request to the arbiter 120 as a serviceable grant request. The method 400 then proceeds to step 445.

In step 445, the arbiter 120 determines whether to select the serviceable grant request. The arbiter 120 can determine whether to select the serviceable grant request based on a selection algorithm. For example, the arbiter 120 can select the serviceable grant request based on a round robin algorithm. If the arbiter 120 selects the serviceable grant request, the method 400 proceeds to step 450, otherwise the method 400 returns to step 405.

In step 450, arrived at from the determination in step 445 that the arbiter 120 selected the serviceable grant request, the arbiter 120 issues a grant to the input port 110 that issued the selected grant request and to the corresponding grant request filter 115. Further, if the input port 110 that issued the selected grant request has an outstanding hold grant identifying the pseudo-port also identified by the selected grant request, the arbiter 120 updates the availability signal to indicate the pseudo-port identified by the hold request no longer has a hold. In this way, the arbiter 120 relinquishes the hold grant identifying the pseudo-port. The method 400 then proceeds to step 455.

In optional step 455, the grant request filter 115 issues a packet grant to the arbiter 120 for routing a data packet. The packet grant identifies the input port 110 and the pseudo-port. Additionally, the arbiter 120 updates the availability signal based on the packet grant to indicate that the pseudo-port identified by the packet grant is not available. In this way, the pseudo-port is reserved for the input port 110 identified by the packet grant. Additionally, the arbiter 120 can update the availability signal to indicate that other pseudo-ports are not available. For example, the arbiter 120 can update the availability signal to indicate that another pseudo-port, which identifies an output port 125 of the pseudo-port identified by the packet grant, is not available. The method 400 then proceeds to step 460.

In optional step 460, the switch 135 routes data word(s) from the input port 110 that issued the selected grant request to each output port 125 of the pseudo-port identified by the selected grant request. Each output port 125 of the pseudo-port stores the data word(s) into an output buffer 130 of the output port 125. In one embodiment, each output port 125 of the pseudo-port receives a control signal from the arbiter 120 indicating a priority. In this embodiment, the output port 125 stores each data word in an output buffer 130 of the output port 125 having the priority.

If the input port 110 corresponding to the grant request filter 115 has an outstanding packet grant identifying the pseudo-port, the switch 135 can route an additional data word of the data packet to each output port 125 of the pseudo-port identified by the packet grant. In this process, the input port 110 issues a grant request for the additional data word of the data packet to the grant request filter 115. The grant request identifies the pseudo-port of the packet grant. The grant request filter 115 issues the grant request to the arbiter 120 as a serviceable grant request. The arbiter 120 selects the serviceable grant request and issues a grant to the input port 110 and the grant request filter 115. The switch 135 then routes the additional data word from the input port 110 to the output ports 125 of the pseudo-port identified by the packet grant, and the output ports 125 store the additional data word. This process may be repeated for any additional data word of the data packet. The method 400 then proceeds to step 465.

In optional step 465, the grant request filter 115 issues a stop packet grant to the arbiter 120 to relinquish the packet grant. Additionally, the arbiter 120 updates the availability signal to indicate that the pseudo-port identified by the packet grant is available. In this process, the arbiter 120 may also update the availability signal to indicate that one or more other pseudo-ports are available because the pseudo-port identified by the packet grant is available.

In one embodiment, the input port 110 can issue an abort signal to the grant request filter 115 to abort routing of a data packet. In response to the abort signal from the input port 110, the grant request filter 115 issues the stop packet grant to the arbiter 120 to relinquish the packet grant. In addition to providing the abort signal to the grant request filter 115, the input port 110 appends control information to data of the data packet indicating that any data of the data packet is to be discarded. The switch 135 routes the data containing the control information to each output port 125 of the pseudo-port. In turn, each output port 125 of the pseudo-port discards the data and any data of the data packet stored in the output port 125. The method 400 then ends. In an alternative embodiment, the method 400 returns to step 405 after step 465.

In other embodiments, the steps 405-465 of the method 400 may be performed in a different order. For example, the step may 410 may be performed before the step 405. In various embodiments, some of the steps 405-465 may be performed in parallel with each other. For example, the steps 405 and 410 may be performed in parallel. In some embodiments, the steps 405-465 may be performed at substantially the same time. For example, steps 405 and 410 may be performed substantially simultaneously.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A method for arbitration in a packet switch comprising a first plurality of input ports and a first plurality of output ports, the method comprising:

generating by an arbiter in a first clock cycle an availability signal indicating whether each pseudo-port of a plurality of pseudo-ports is available in a second clock cycle following the first clock cycle, each pseudo-port of the plurality of pseudo-ports identifying a respective second plurality of output ports in the first plurality of output ports and being available if each output port of the second plurality of output ports is available to receive data in the second clock cycle, wherein the availability signal comprises both a plurality of availability indicators and a plurality of hold indicators corresponding to the plurality of pseudo-ports, each availability indicator of the plurality of availability indicators indicating whether the corresponding pseudo-port is available, each hold indicator of the plurality of hold indicators indicating whether the corresponding pseudo-port has a hold;

receiving a first grant request by a first grant request filter, the first grant request identifying a first input port of the first plurality of input ports and a first pseudo-port of the plurality of pseudo-ports;

determining by the first grant request filter the first grant request is not serviceable in the second clock cycle based on the availability signal;

issuing a hold request by the first grant request filter;

issuing a hold grant by the arbiter in response to the hold request, the hold grant indicating the first pseudo-port is being held for the first input port, wherein issuing the hold grant further comprises updating the availability signal to indicate the first pseudo-port has a hold;

receiving by a second grant request filter a second grant request identifying a second input port of the plurality of input ports and the first pseudo-port;

determining by the second grant request filter the second grant request is not serviceable based on the updated availability signal;

determining by the first grant request filter a third grant request is serviceable by determining the first pseudo-port is being held for the first input port and is available based on the updated availability signal corresponding to the first pseudo-port;

issuing by the first grant request filter a serviceable grant request based on the third grant request;

issuing a grant by the arbiter in response to the serviceable grant request; and routing a first data packet by the packet switch from the first input port to each output port identified by the first pseudo-port in response to the grant.

2. The method of claim 1, further comprising:

issuing a packet grant by the first grant request filter in response to the grant;

updating the availability signal by the arbiter in response to the packet grant to indicate the first pseudo-port is not available;

issuing a stop packet grant by the arbiter to relinquish the packet grant after the first data packet is routed to each output port identified by the first pseudo-port; and updating the availability signal by the arbiter in response to the stop packet grant to indicate the first pseudo-port is available.

3. The method of claim 1, wherein the first pseudo-port identifies a priority, and wherein each output port identified by the first pseudo-port is available to receive data in the second clock cycle if the output port is available to receive data having the priority in the second clock cycle.

4. The method of claim 1, wherein each output port identified by the first pseudo-port comprises a plurality of output buffers each having a priority, and wherein each output port identified by the first-pseudo-port is available to receive data having the priority in the second clock cycle if an output buffer having the priority in the output port is available to receive data in the second clock cycle.

5. A system for arbitration in a packet switch comprising a first plurality of input ports and a first plurality of output ports, the system comprising:

an arbiter configured to generate in a first clock cycle an availability signal indicating whether each pseudo-port of a plurality of pseudo-ports is available in a second clock cycle following the first clock cycle, each pseudo-port identifying a respective second plurality of output ports in the first plurality of output ports and being available if each output port of the second plurality of output ports is available to receive data in the second clock cycle, wherein the availability signal comprises both a plurality of availability indicators and a plurality of hold indicators corresponding to the plurality of pseudo-ports, each availability indicator of the plurality of availability indicators indicating whether the corresponding pseudo-port is available, each hold indicator of the plurality of hold indicators indicating whether the corresponding pseudo-port has a hold;

a first grant request filter coupled to the arbiter and configured to receive a first grant request identifying a first input port of the first plurality of input ports and a first pseudo-port of the plurality of pseudo-ports, determine the first grant request is not serviceable in the second clock cycle based on the availability signal, and issue a hold request, the arbiter further configured to issue a hold grant in response to the hold request and update the availability signal to indicate the first pseudo-port has a hold, the hold grant indicating the first pseudo-port is being held for the first input port;

a second grant request filter coupled to the arbiter and configured to receive a second grant request identifying a second input port of the plurality of input ports and the first pseudo-port, the second grant request filter further configured to determine the second grant request is not serviceable based on the updated availability signal, the first grant request filter further configured to determine a third grant request is serviceable by determining the first pseudo-port is being held for the first input port and is available based on the updated availability signal corresponding to the first pseudo-port, and issue the third grant request to the arbiter as a serviceable grant request, the arbiter further configured to issue a grant in response to the serviceable grant request; and the packet switch configured to route a first data packet from the first input port to each output port identified by the first pseudo-port in response to the grant.

6. The system of claim 5, wherein the first grant request filter is further configured issue a packet grant in response to the grant and wherein the arbiter is further configured to update the availability signal in response to the packet grant to indicate the first pseudo-port is not available, and wherein the first grant request filter is further configured to issue a stop packet grant to relinquish the packet grant after the first data packet is routed to each output port identified by the first pseudo-port and the arbiter is further configured to update the availability signal in response to the stop packet grant to indicate the pseudo-port is available.

7. The system of claim 5, wherein the first pseudo-port identifies a priority, and wherein each output port identified by the first pseudo-port is available to receive data in the second clock cycle if the output port is available to receive data having the priority in the second clock cycle.

8. The system of claim 5, wherein each output port identified by the first pseudo-port comprises a plurality of output buffers each having a priority, and wherein each output port identified by the first pseudo-port is available to receive data having the priority in the second clock cycle if an output buffer having the priority in the output port is available to receive data in the second clock cycle.

9. A packet switch comprising:
a plurality of output ports;
an arbiter coupled to the plurality of output ports and configured to generate in a first clock cycle an availability signal indicating whether each pseudo-port of a plurality of pseudo-ports is available in a second clock cycle following the first clock cycle, each pseudo-port of the plurality of pseudo-ports identifying at least two output ports of the plurality of output ports and being available if each of the at least two output ports is available to receive data in the second clock cycle;
a plurality of input ports, a first input port of the plurality of input ports configured to issue a first grant request for routing a first data packet to the output ports identified by a pseudo-port of the plurality of pseudo-ports, a second input port of the plurality of input ports configured to issue a second grant request for routing a second data packet to the output ports identified by the pseudo-port;
a switch coupled to the plurality of input ports and the plurality of output ports for routing data packets from the plurality of input ports to the plurality of output ports;
a first grant request filter coupled to the first input port and the arbiter and configured to determine the first grant request is not serviceable based on the availability signal and issue a hold request identifying the pseudo-port, the arbiter further configured to issue a hold grant in response to the hold request and update the availability signal to indicate the pseudo-port has a hold; and
a second grant request filter coupled to the second input port and the arbiter and configured to determine the second grant request is not serviceable based on the updated availability signal and the hold grant, the first grant request filter further configured to determine a third grant request is serviceable based on the updated availability signal and the hold grant and issue a serviceable grant request based on the third grant request, the arbiter further configured to issue a grant in response to the serviceable grant request for routing by the packet switch, the first data packet from the first input port to each output port identified by the pseudo-port in response to the grant.

10. The packet switch of claim 9, wherein the first grant request filter is further configured issue a packet grant in response to the grant, the arbiter is further configured to update the availability signal in response to the packet grant to indicate the pseudo-port is not available, the first grant request filter is further configured to issue a stop packet grant to relinquish the packet grant after the first data packet is routed to each output port identified by the pseudo-port, and the arbiter is further configured to update the availability signal in response to the stop packet grant to indicate the pseudo-port is available.

11. The packet switch of claim 9, wherein the pseudo-port identifies a priority, and wherein each output port identified by the pseudo-port is available to receive data of a data packet if the output port is available to receive data of a data packet having the priority.

12. The packet switch of claim 9, wherein each output port identified by the pseudo-port comprises a plurality of output buffers each having a priority, and wherein each output port identified by the pseudo-port is available to receive data of a data packet having the priority if an output buffer having the priority in the output port is available to receive data of a data packet.

* * * * *